United States Patent
Takao et al.

(10) Patent No.: US 9,509,156 B2
(45) Date of Patent: Nov. 29, 2016

(54) POWER SUPPLY APPARATUS

(75) Inventors: Hiroshi Takao, Osaka (JP); Hideaki Aoki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 14/129,674

(22) PCT Filed: May 2, 2012

(86) PCT No.: PCT/JP2012/061597
§ 371 (c)(1),
(2), (4) Date: Feb. 5, 2014

(87) PCT Pub. No.: WO2013/001909
PCT Pub. Date: Jan. 3, 2013

(65) Prior Publication Data
US 2014/0191705 A1    Jul. 10, 2014

(30) Foreign Application Priority Data

Jun. 30, 2011   (JP) ................................. 2011-146393

(51) Int. Cl.
| | |
|---|---|
| *H02J 7/14* | (2006.01) |
| *H02J 7/00* | (2006.01) |
| *H01M 10/42* | (2006.01) |
| *H01M 10/44* | (2006.01) |

(52) U.S. Cl.
CPC ............ *H02J 7/0054* (2013.01); *H01M 10/42* (2013.01); *H02J 7/0063* (2013.01); *H02J 7/0068* (2013.01); *H01M 10/448* (2013.01); *H01M 2220/10* (2013.01); *H01M 2220/20* (2013.01); *H02J 2007/0062* (2013.01)

(58) Field of Classification Search
USPC .................................. 320/103, 128, 107, 162
See application file for complete search history.

(56) References Cited

U.S. PATENT DOCUMENTS

| | | | |
|---|---|---|---|
| 6,104,160 A | 8/2000 | Iwata et al. | |
| 2007/0252553 A1* | 11/2007 | Mori | H02J 7/0047 320/114 |
| 2008/0018303 A1* | 1/2008 | Scheucher | H01M 2/1072 320/128 |
| 2010/0114800 A1 | 5/2010 | Yasuda et al. | |
| 2010/0289452 A1 | 11/2010 | Wagatsuma et al. | |

(Continued)

FOREIGN PATENT DOCUMENTS

| | | |
|---|---|---|
| CN | 101878577 | 11/2010 |
| JP | 8-182206 | 7/1996 |

(Continued)

OTHER PUBLICATIONS

International Search Report issued Jul. 31, 2012 in corresponding International Application No. PCT/JP2012/061597.

(Continued)

*Primary Examiner* — Brian Ngo
(74) *Attorney, Agent, or Firm* — Wenderoth, Lind & Ponack, L.L.P.

(57) ABSTRACT

A battery charger in a power supply apparatus is mechanically and electrically connectable to and disconnectable from a battery that is for supplying electric power to a power-assisted bicycle, and includes an AC outlet and a USB connecting terminal that are electrically connected with the other apparatus and supply the electric power from the battery to the other apparatus.

15 Claims, 11 Drawing Sheets

(56) References Cited

U.S. PATENT DOCUMENTS

2011/0078092 A1* 3/2011 Kim .................... B60L 11/1824
   705/412
2011/0279078 A1* 11/2011 Hara ....................... H02J 7/085
   320/107

FOREIGN PATENT DOCUMENTS

| | | |
|---|---|---|
| JP | 10-84641 | 3/1998 |
| JP | 11-178234 | 7/1999 |
| JP | 2002-205683 | 7/2002 |
| JP | 2003-331928 | 11/2003 |
| JP | 2006-158084 | 6/2006 |
| JP | 2009-183016 | 8/2009 |
| JP | 2009-201275 | 9/2009 |
| JP | 2010-108833 | 5/2010 |

OTHER PUBLICATIONS

Office Action along with search report mailed on Jun. 2, 2015 in corresponding Chinese patent application No. 201280020662.4 (with English translation of search report).

* cited by examiner

FIG. 4

| Charging/discharging switch | Condition | Battery conduction switch | AC/DC converter | DC/AC inverter | DC-DC converter |
|---|---|---|---|---|---|
| Charging ON (Discharging OFF) | Charging permitted | ON | ON | OFF | OFF |
| | Charging not permitted | OFF | OFF | OFF | OFF |
| Discharging ON (Charging OFF) | Discharging permitted | ON | OFF | ON | ON |
| | Discharging not permitted | OFF | OFF | OFF | OFF |

FIG. 9

| Parameter items | Condition | Alarm sound | Stop supplying electric power |
|---|---|---|---|
| Residual charge amount of battery | 5% or less | ○ | — |
| | 0% or less | — | ○ |
| Current of battery | 25 A or more | ○ | — |
| | 30 A or more | — | ○ |
| Voltage of battery | 20 V or less | ○ | — |
| | 18 V or less | — | ○ |
| Temperature of battery | 55°C or more | ○ | — |
| | 60°C or more | — | ○ |
| Temperature of charger | 55°C or more | ○ | — |
| | 60°C or more | — | ○ |

POWER SUPPLY APPARATUS

TECHNICAL FIELD

The present invention relates to a battery charger for charging a battery which supplies electric power to a specific apparatus. Moreover, the present invention relates to a power supply apparatus including the battery charger and the battery which supplies the electric power to the specific apparatus.

BACKGROUND ART

Electric vehicles such as electric cars, electric motorbikes, and power-assisted bicycles and electric tools such as electric drills have batteries which are secondary batteries, and drive the motors thereof using electric power from the batteries. For charging the batteries mounted on the electric vehicles and electric tools, battery chargers which use a commercial AC power source are used. Patent Literature (PTL) 1 describes such a battery charger.

CITATION LIST

Patent Literature

[PTL 1] Japanese Unexamined Patent Application Publication No. 8-182206

SUMMARY OF INVENTION

Technical Problem

The battery charger described in PTL 1 has a function to charge a battery, but does not have a function to enable electric power in the battery to be used for apparatuses other than an original apparatus to which electric power is supplied. For example, it is assumed that at the time of failure of a commercial AC power source or power shortage, a battery for an electric vehicle or an electric tool and a battery charger described in PTL 1 for charging the battery are prepared. In this case, the battery charger described in PTL 1 does not enable the electric power in the battery to be used as a power source for, for example, other apparatuses such as a lighting apparatus and a television apparatus.

The present invention was conceived in view of the aforementioned problem and has an object to provide a battery charger which enables a battery mounted on a specific apparatus such as an electric vehicle and an electric tool to be used as a power source for other apparatuses. Moreover, the present invention has an object to provide a power supply apparatus including such a battery charger and a battery which supplies electric power to a specific apparatus.

Solution to Problem

In order to solve the aforementioned problem, the battery charger according to the present invention is a battery charger which is mechanically and electrically connectable to and disconnectable from a battery that is for supplying electric power to a specific apparatus, the battery charger including an output terminal unit configured to supply electric power from the battery to another apparatus by being electrically connected to the other apparatus.

Moreover, in the battery charger configured as above, the battery charger is mechanically and electrically connectable to and disconnectable from the battery that has been detached from the specific apparatus.

Moreover, the battery charger configured as above further includes a power converting unit configured to convert the electric power in the battery for supplying the electric power in the battery to the other apparatus.

Moreover, in the battery charger configured as above, the battery supplies DC power, the battery charger further includes an inverter for converting the DC power in the battery into AC power, and the output terminal unit is an AC output unit configured to supply the AC power resulting from the conversion by the inverter.

Moreover, in the battery charger configured as above, the battery supplies DC power, the battery charger further includes a converter for converting a voltage of the DC power in the battery, and the output terminal unit is an AC output unit configured to supply the DC power the voltage of which has been converted by the converter.

Moreover, the battery charger configured as above further includes a charging/discharging switch for switching between charging of the battery and discharging in which the electric power in the battery is supplied to the other apparatus.

Moreover, the battery charger configured as above further includes a communication unit configured to receive at least one of information items regarding a residual charge amount, a current, a voltage, and a temperature of the battery through communication; and an alarming unit configured to output, to outside, information indicating a state of the battery when the residual charge amount of the battery decreases to a first predetermined residual charge amount, when the current of the battery increases to a first predetermined current value, when the voltage of the battery decreases to a first predetermined voltage value, or when the temperature of the battery increases to a first predetermined battery temperature, the residual charge amount, the current, the voltage, or the temperature being the at least one of information items received via the communication unit.

It is to be noted that the "first predetermined residual charge amount," the "first predetermined current value," the "first predetermined voltage value," and the "first predetermined battery temperature" described above are preset arbitrary residual charge amount, current value, voltage value, and temperature of the battery.

Moreover, the battery charger configured as above further includes a temperature detecting unit configured to detect a temperature of the battery charger; and an alarming unit configured to output, to outside, information indicating a state of the battery charger when the temperature of the battery charger detected by the temperature detecting unit increases to a first predetermined charger temperature.

It is to be noted that the "first predetermined charger temperature" described above is a preset arbitrary temperature of the battery charger.

Moreover, the battery charger configured as above further includes a communication unit configured to receive information transmitted from the battery and indicating that the battery is approaching a limit with respect to the supplying of the electric power; and an alarming unit configured to output, to outside, the information received via the communication unit and indicating that the battery is approaching the limit with respect to the supplying of the electric power.

Moreover, the battery charger configured as above further includes a communication unit configured to receive at least one of information items regarding a residual charge amount, a current, a voltage, and a temperature of the battery through communication; and a forced outage unit configured to stop supplying the electric power from the battery to the other apparatus when the residual charge amount of the battery decreases to a second predetermined residual charge amount, when the current of the battery increases to a second predetermined current value, when the voltage of the battery decreases to a second predetermined voltage value, or when the temperature of the battery increases to a second predetermined battery temperature, the residual charge amount, the current, the voltage, or the temperature being the at least one of information items received via the communication unit.

It is to be noted that the "second predetermined residual charge amount," the "second predetermined current value," the "second predetermined voltage value," and the "second predetermined battery temperature" described above are preset arbitrary residual charge amount, current value, voltage value, and temperature of the battery.

Moreover, the battery charger configured as above further includes a temperature detecting unit configured to detect a temperature of the battery charger; and a forced outage unit configured to stop supplying the electric power from the battery to the other apparatus when the temperature of the battery charger detected by the temperature detecting unit increases to a second predetermined charger temperature.

It is to be noted that the "second predetermined charger temperature" is a preset arbitrary temperature of the battery charger.

Furthermore, when the "first predetermined residual charge amount," the "first predetermined current value," the "first predetermined voltage value," the "first predetermined battery temperature" and the "first predetermined charger temperature" described above (hereinafter also referred to as "first predetermined value" collectively) and the "second predetermined residual charge amount," the "second predetermined current value," the "second predetermined voltage value," the "second predetermined battery temperature" and the "second predetermined charger temperature" described above (hereinafter also referred to as "second predetermined value" collectively) are used together, the first predetermined value and the second predetermined value can be set to different values.

Moreover, the battery charger configured as above further includes a communication unit configured to receive information transmitted from the battery and indicating that the battery has reached a limit with respect to the supplying of the electric power; and a forced outage unit configured to stop supplying the electric power from the battery to the other apparatus under a condition that the information indicating that the battery has reached the limit is received via the communication unit.

Moreover, a power supply apparatus according to the present invention includes the battery charger according to any one of claim 1 to claim 12; and a battery which is mechanically and electrically connectable to and disconnectable from the battery charger and which is for supplying the electric power to the specific apparatus.

Advantageous Effects of Invention

According to a configuration of the present invention, it is possible to provide a battery charger and a power supply apparatus which enable a battery mounted on a specific apparatus such as an electric vehicle and an electric tool to be used as a power source for other apparatuses. Moreover, it is possible to provide a power supply apparatus including such a battery charger and a battery which supplies electric power to a specific apparatus.

BRIEF DESCRIPTION OF DRAWINGS

FIG. 4 is a table showing statuses of structural elements of the battery charger in FIG. 1 at the time of charging and discharging.

FIG. 5 is a block diagram showing a state of the battery charger in FIG. 1 when charging is ON.

FIG. 7 is a block diagram showing a state of the battery charger in FIG. 1 when discharging is ON.

FIG. 9 is a table showing conditions for outputting an alarm sound and conditions for stopping power supply.

DESCRIPTION OF EMBODIMENTS

[Embodiment 1]

Hereinafter, embodiments of the present invention will be described with reference to FIGS. 1 to 11.

Figure 1:
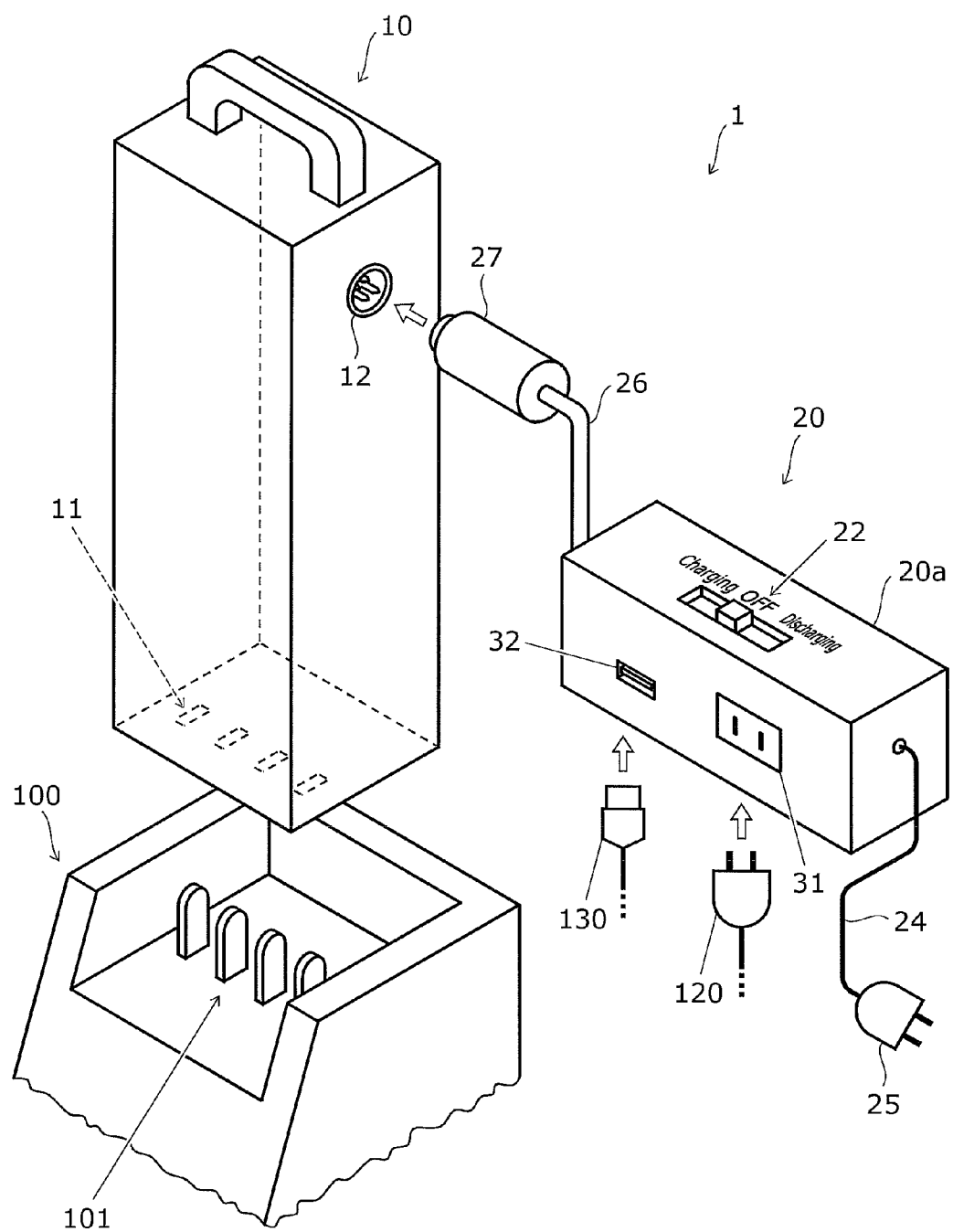
FIG. 1 is a perspective view showing a power supply apparatus including a battery charger and a battery connected to the battery charger according to Embodiment 1 of the present invention.
Figure 2:
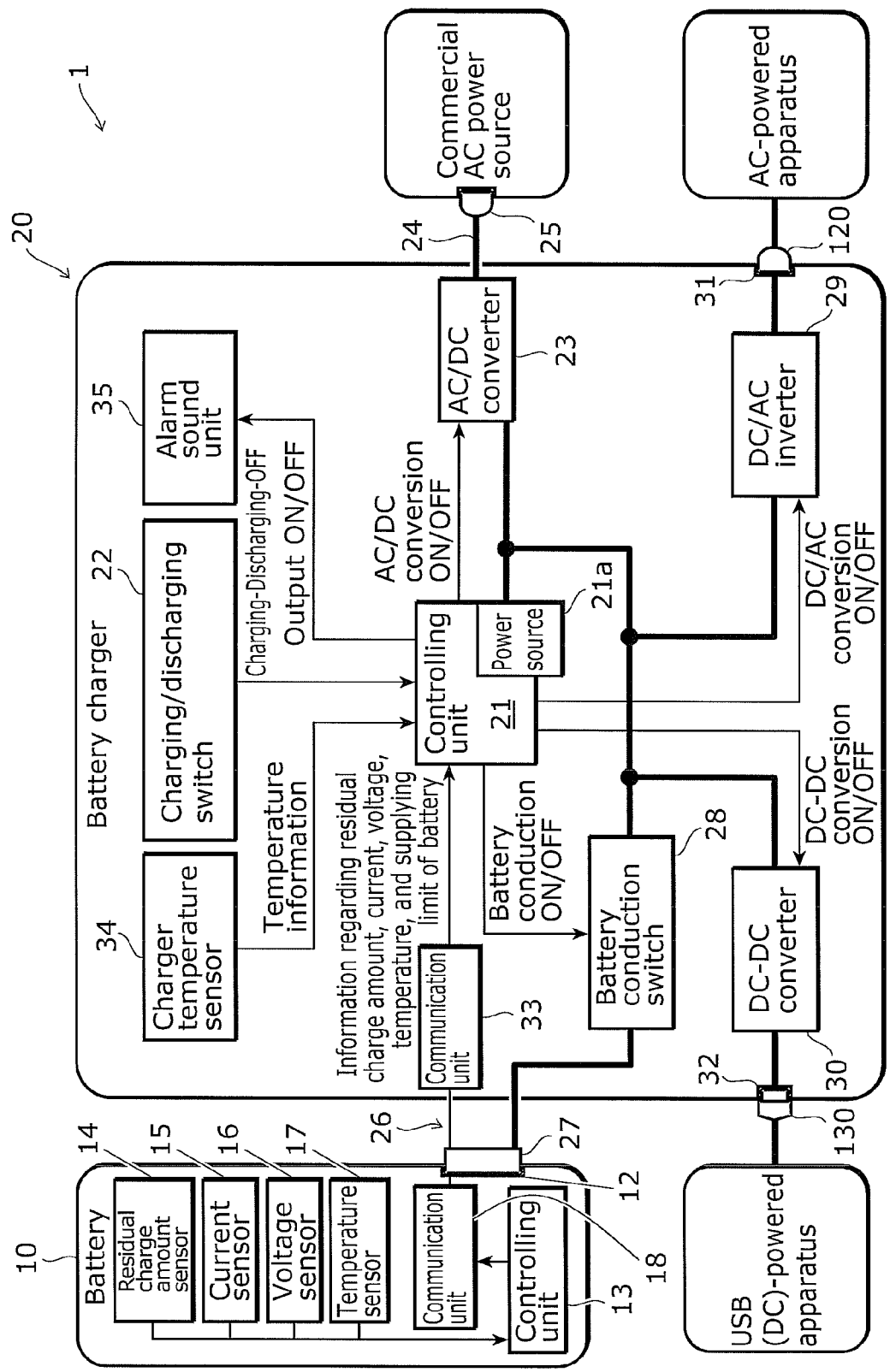
FIG. 2 is a block diagram showing a configuration of the battery charger in FIG. 1.
Figure 3:
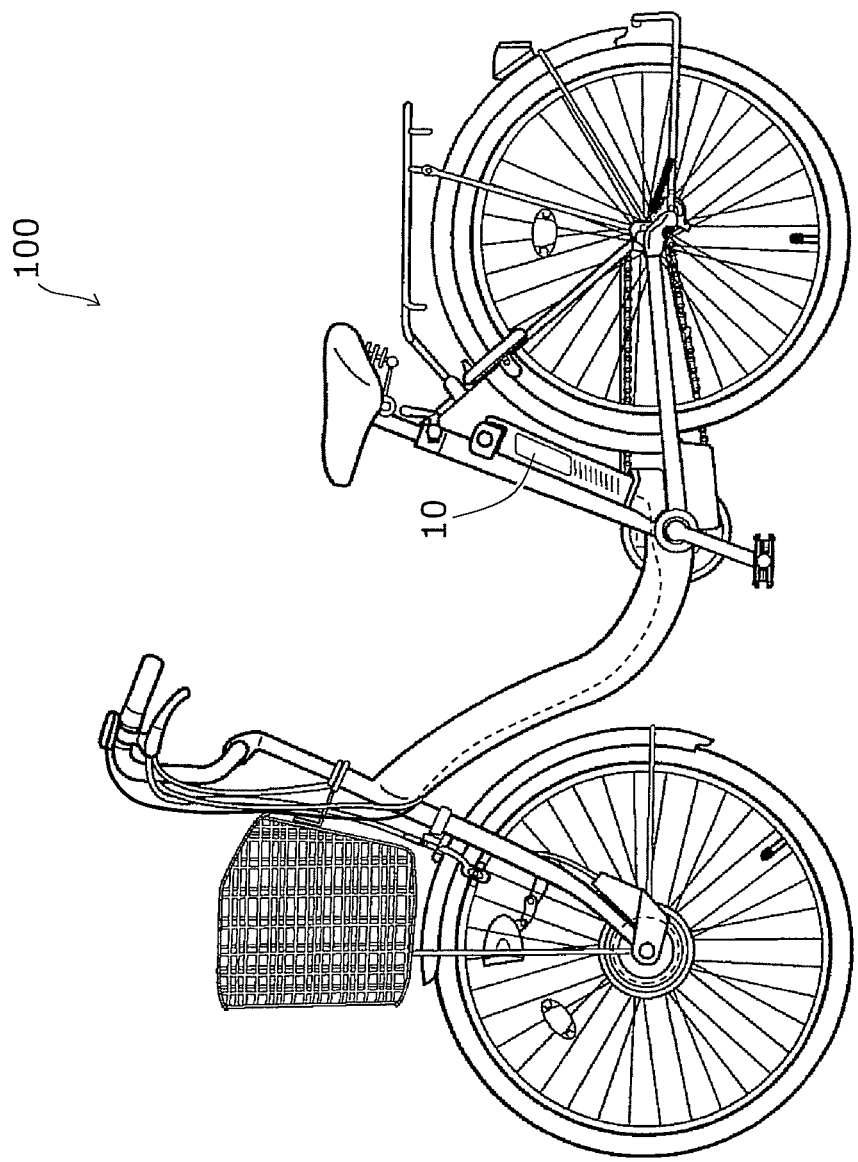
FIG. 3 is a side view of a power-assisted bicycle which is an example of a specific apparatus on which the battery in FIG. 1 is mounted.

First, a configuration of a power supply apparatus including a battery charger according to Embodiment 1 of the present invention is described with reference to FIGS. 1 to 3. FIG. 1 is a perspective view showing a power supply apparatus including a battery charger and a battery connected to the battery charger, FIG. 2 is a block diagram showing a configuration of the battery charger, and FIG. 3 is a side view of a power-assisted bicycle which is an example of a specific apparatus on which the battery in FIG. 1 is mounted. It is to be noted that the thick solid line inside the battery charger shown in FIG. 2 expresses a power line and the thin solid arrow expresses a signal line.

A power supply apparatus 1 includes a battery 10 and a battery charger 20 as shown in FIG. 1.

The battery 10 is a battery for supplying electric power to a power-assisted bicycle 100 which is an example of specific apparatuses as shown in FIG. 3. A battery pack including secondary batteries exclusively designed for the specific apparatus (in this case, a power-assisted bicycle) to which electric power is supplied is used. Such a battery pack contains so-called a battery module having plural secondary cells such as nickel hydride batteries and lithium-ion batteries therein.

The size and the shape of the battery 10 are predetermined in order to be mounted on the power-assisted bicycle 100. Moreover, the battery 10 includes a bicycle connecting terminal 11 as shown in FIG. 1. In general, the battery 10 supplies electric power to the power-assisted bicycle 100 when attached and electrically connected to a battery connecting terminal 101 of the power-assisted bicycle 100 via the bicycle connecting terminal 11. Therefore, the bicycle connecting terminal 11 of the battery 10 has a position, a shape, and a size corresponding to the power-assisted bicycle 100 and is exclusively for the power-assisted bicycle 100.

The battery charger 20 is mechanically and electrically connectable to and disconnectable from the battery 10 which is detached from the power-assisted bicycle 100 as shown in FIG. 1. The battery charger 20 includes, in the body case 20a, a controlling unit 21, a charging/discharging switch 22, an AC/DC converter 23, a power cable 24, a power plug 25, a charging cable 26, a charging connector 27, a battery conduction switch 28, a DC/AC inverter 29, a DC-DC converter 30, an AC outlet 31, a USB connecting terminal 32, a communication unit 33, a charger temperature sensor 34, and an alarm sound unit 35 as shown in FIGS. 1 and 2.

The controlling unit 21 of the battery charger 20 includes a general microcomputer, and controls the AC/DC converter 23, etc. using the microcomputer based on the status of the charging/discharging switch 22 to charge or discharge the battery 10. The charging/discharging switch 22 is provided on a surface of the body case 20a, and is capable of switching, by a user's operation, among charging the battery 10, discharging for supplying the electric power from the battery 10 to the other apparatuses, and stopping the charging or discharging for the battery 10, that is, operation OFF.

The AC/DC converter 23 is connected to a commercial AC power source via a power cable 6 and a power plug 25, and generates DC power necessary for charging the battery 10 from the commercial AC power. The power line extending from the AC/DC converter 23 into the battery charger 20 is connected to a charging cable 26 used for connecting with the battery 10, a charging connector 27, and a power source unit 21a in the controlling unit 21.

It is to be noted that the charging connector 27 is inserted and connected to a charger connecting terminal 12 of the battery 10. With this connection, the battery charger 20 is mechanically and electrically connected to the battery 10. On the other hand, when the charging connector 27 is detached from the charger connecting terminal 12, the battery charger 20 is mechanically and electrically disconnected from the battery 10. The battery 10 includes the charger connecting terminal 12 besides a bicycle connecting terminal 11.

In the middle of the power line extending from the AC/DC converter 23 to the charging cable 26, a battery conduction switch 28 is provided. The battery conduction switch 28 is inside the battery charger 20 which is controlled by the controlling unit 21 and used for switching ON and OFF of conduction between the battery charger 20 and the battery 10.

The DC/AC inverter 29 and the DC-DC converter 30 are connected to the middle of the power line extending from the AC/DC converter 23 to the battery conduction switch 28.

The DC/AC inverter 29 is a power converting unit which converts the DC power in the battery 10 into the AC power so that the power can be used as a power source for other AC-powered apparatuses such as a television. The DC/AC inverter 29 is connected to an AC outlet 31 which is an AC output unit (output terminal unit) provided on a surface of the body case 20a for supplying the AC power resulting from the conversion by the DC/AC inverter 29 to the other apparatuses. To the AC outlet 31, a power plug 120 of the television is connected, for example.

The DC-DC converter 30 is a power converting unit which converts the voltage of the DC power in the battery 10 so that the power can be used for other AC-powered apparatuses, for example, for charging a mobile phone. The DC-DC converter 30 is connected to the USB connecting terminal 32 which is a DC output unit (output terminal unit) provided on a surface of the body case 20a for supplying the DC power the voltage of which has been converted by the DC-DC converter 30 to the other apparatuses. To the USB connecting terminal 32, a USB connector 130 for charging the mobile phone is connected, for example.

The communication unit 33 includes a communication circuit which is used when the controlling unit 21 obtains a variety of information about the battery 10. The controlling unit 21 receives information regarding the residual charge amount, the current, the voltage, and the temperature of the battery 10 from the battery 10 via the communication unit 33 through communication. In this regard, the charging cable 26 and the charging connector 27 used for connecting with the battery 10 include signal lines in addition to the power lines. Moreover, the controlling unit 21 receives information regarding the temperature of the battery charger 20 from the charger temperature sensor 34 which is provided inside the battery charger 20 and is a temperature detecting unit for detecting the temperature of the battery charger 20.

Here, the battery 10 includes a controlling unit 13, a residual charge amount sensor 14, a current sensor 15, a voltage sensor 16, a temperature sensor 17, and a communication unit 18.

The controlling unit 13 of the battery 10 includes a general microcomputer, and controls the charging and discharging using the microcomputer based on the information obtained from the above sensors such as the residual charge amount sensor 14 so that the charging and discharging of the battery 10 is appropriately performed. The residual charge amount sensor 14 detects the residual charge amount of the battery 10, the current sensor 15 detects the current of the battery 10, the voltage sensor 16 detects the voltage of the battery 10, and the temperature sensor 17 detects the temperature of the battery 10. Moreover, the controlling unit 13 is capable of identifying that the discharging by which the battery 10 supplies the electric power is approaching a limit or has reached the limit based on the information obtained from the above sensors.

The communication unit 18 in the battery 10 includes a communication circuit which is used when the controlling unit 13 transmits a variety of information about the battery 10. The controlling unit 13 transmits information regarding the residual charge amount, the current, the voltage, and the temperature of the battery 10 from the battery 10 via the communication unit 18 through communication. Furthermore, the controlling unit 13 transmits information indicating that the battery 10 is approaching the limit or has reached the limit with respect to the discharging in which the battery 10 supplies the electric power from the battery 10 via the communication unit 18 through communication. The information regarding the residual charge amount, the current, the voltage, the temperature, and the supplying limit of the battery 10 transmitted from the battery 10 is received by the controlling unit 21 in the battery charger 20 via the communication unit when the battery 10 and the battery charger 20 are connected with each other.

The alarm sound unit 35 in the battery charger 20 is provided as an alarming unit which outputs information indicating the state of the battery 10 or the battery charger 20. The controlling unit 21 transmits an instruction to the alarm sound unit 35 to inform a user of that the battery 10 or the battery charger 20 is approaching the limit with respect to the discharging for supplying electric power to the other apparatuses, for example, by outputting an alarm sound. Conditions for outputting the alarm sound using the alarm sound unit 35 is described later.

Figure 5:
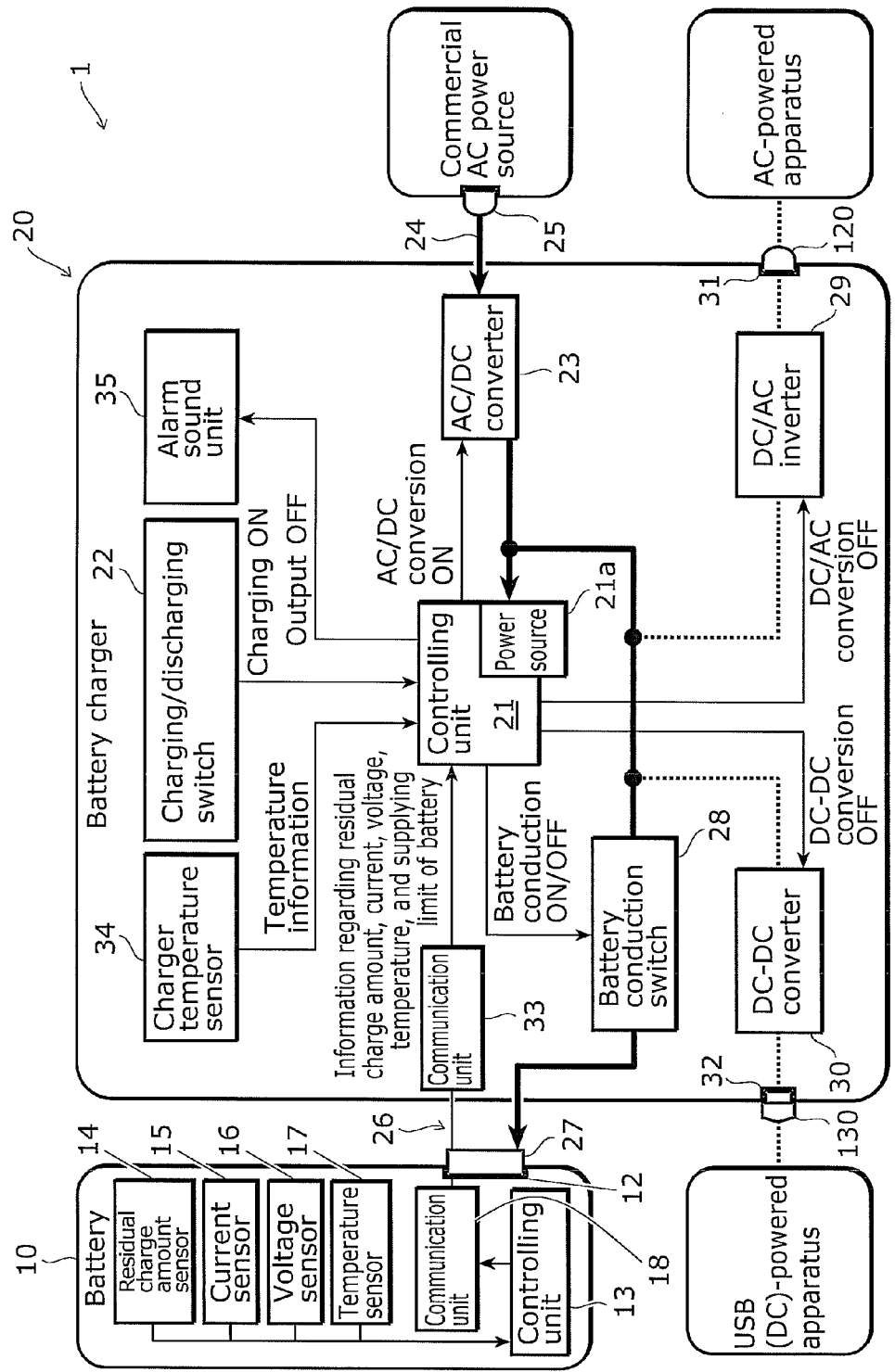
Figure 6:
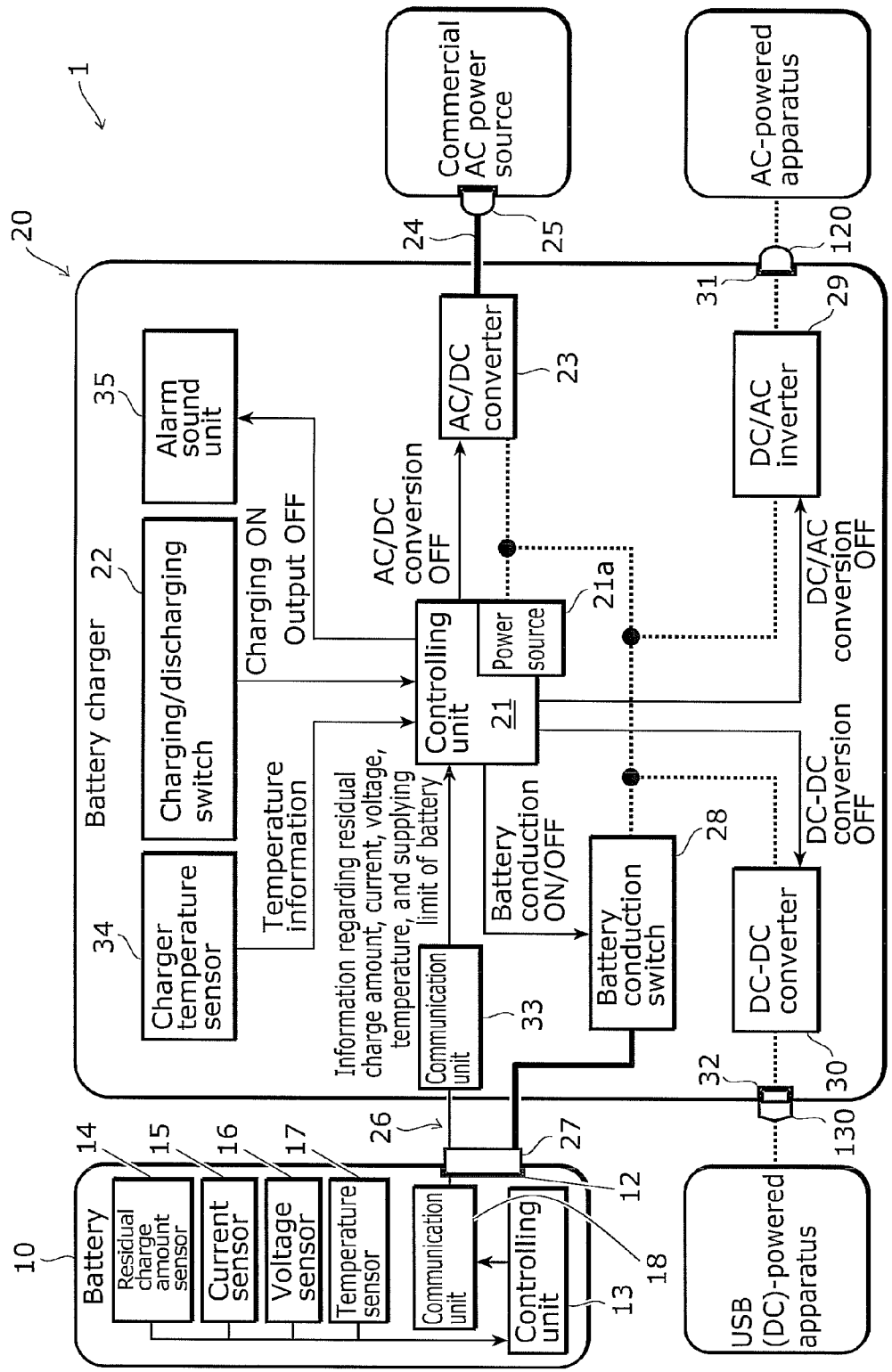
FIG. 6 is a block diagram showing a state of the battery charger in FIG. 1 when charging is OFF.
Figure 7:
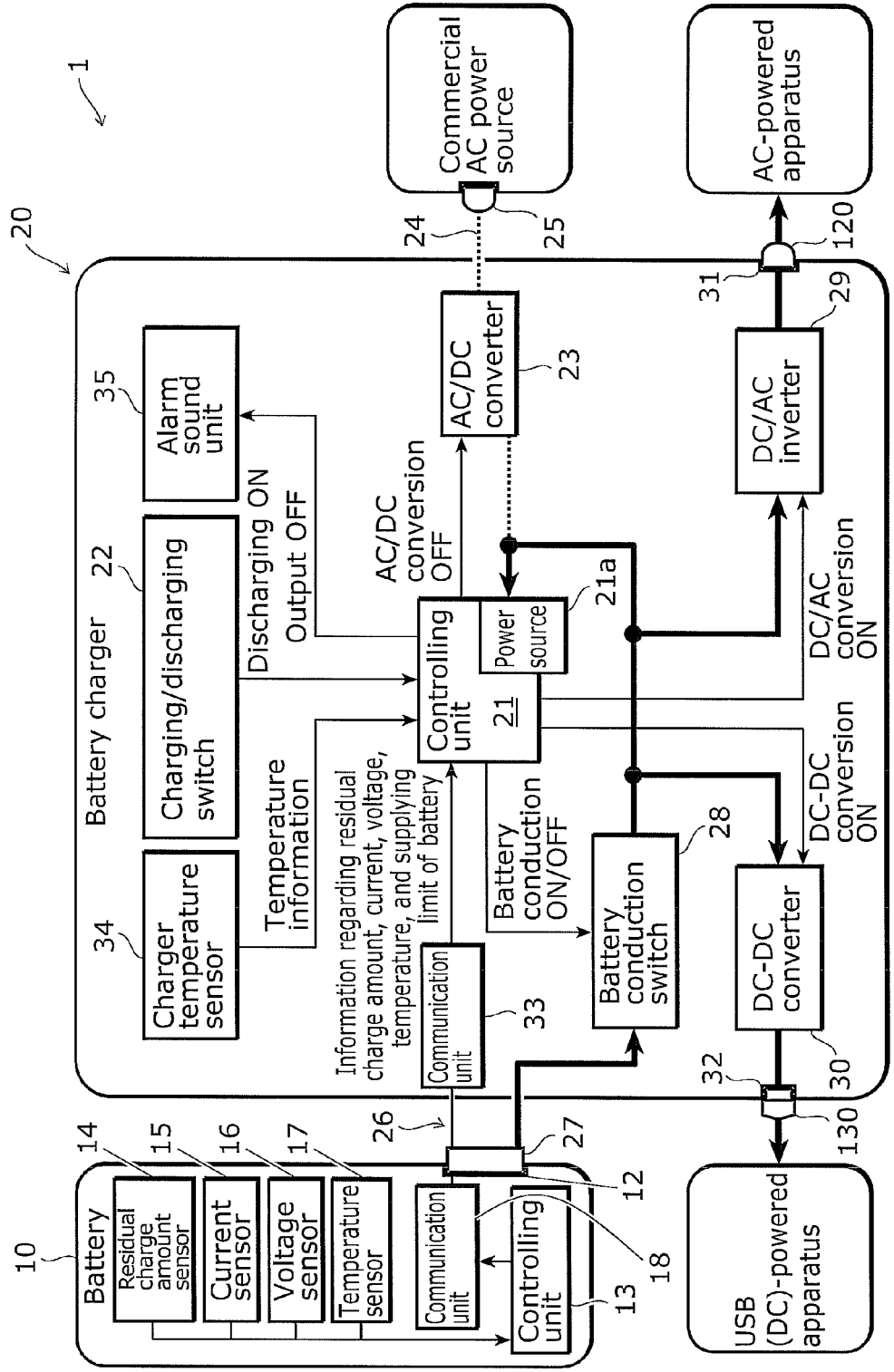
Figure 8:
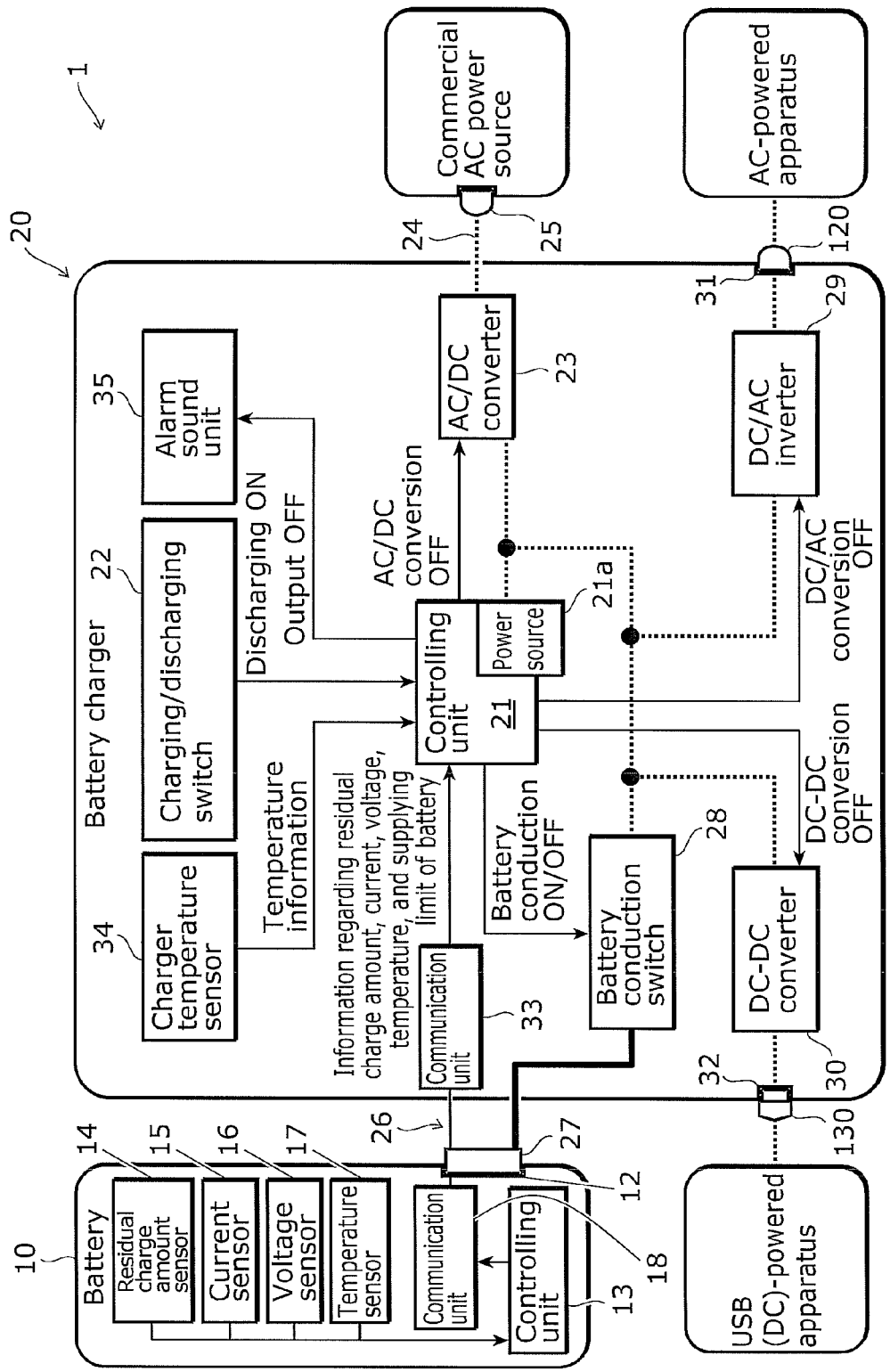
FIG. 8 is a block diagram showing a state of the battery charger in FIG. 1 when discharging is OFF.

Next, operating states of the charging of the battery 10 using the battery charger 20 and the discharging in which the electric power in the battery 10 is supplied to the other apparatuses are described with reference to FIGS. 4 to 9 in addition to FIGS. 1 and 2. FIG. 4 is a table showing statuses of structural elements of the battery charger 20 at the time of charging and discharging, FIG. 5 is a block diagram showing a state of the battery charger 20 when charging is ON, FIG. 6 is a block diagram showing a state of the battery charger 20 when charging is OFF, FIG. 7 is a block diagram showing a state of the battery charger 20 when discharging is ON, FIG. 8 is a block diagram showing a state of the battery charger 20 when discharging is OFF, and FIG. 9 is a table showing conditions for outputting an alarm sound and conditions for stopping power supply by the battery charger 20. It is to be noted that in FIGS. 5 to 8, a power line expressed by a thick solid arrow shows that the current flows, and a power line expressed by a dotted line shows that the current does not flow.

Switching of the charging/discharging switch 22 shown in FIGS. 1 and 2 to "charging" causes the battery charger 20 to be in a state in which charging is ON as shown in FIG. 4, that is, a state in which charging is permitted. At this time, the AC/DC converter 23 turns ON and the electric power is supplied to the power source unit 21a in the controlling unit 21 from a commercial AC power source via the AC/DC converter 23. The controlling unit 21 then transmits instructions to the structural elements to turn the battery conduction switch 28 ON, turn the DC/AC inverter 29 OFF, and turn the DC-DC converter 30 OFF.

Thus, in the battery charger 20, the AC/DC converter 23 which have received AC power from the commercial AC power source as shown in FIG. 5 generates DC power necessary for charging the battery 10. Since the battery conduction switch 28 is ON, the DC electric power generated in the AC/DC converter 23 is transmitted to and charged in the battery 10 via the power line in the battery charger 20, the charging cable 26, and the charging connector 27. Both the DC/AC inverter 29 and the DC-DC converter 30 do not operate because they are OFF.

The controlling unit 21 receives a variety of information from the battery 10 via the communication unit 33, and causes the battery charger 20 to be in a state in which charging is not permitted as shown in FIG. 4, based on information indicating that, for example, the residual charge amount shows that the battery is full. At this time, the controlling unit 21 transmits instructions to the structural elements to turn all of the battery conduction switch 28, the AC/DC converter 23, the DC/AC inverter 29, and the DC-DC converter 30 OFF. As a result, in the battery charger 20, no current flows from the commercial AC power source or the battery 10 as shown in FIG. 6. Since power supply to the power source unit 21a in the controlling unit 21 is interrupted, various communications using the signal lines also enter a state of OFF.

On the other hand, switching of the charging/discharging switch 22 shown in FIGS. 1 and 2 to "discharging" causes the battery charger 20 to be in a state in which discharging is ON as shown in FIG. 4, that is, a state in which discharging is permitted. At this time, the battery conduction switch 28 is turned ON, and thus electric power is supplied to the power source unit 21a in the controlling unit 21 from the battery 10 via the battery conduction switch 28. The controlling unit 21 then transmits instructions to the structural elements to turn the AC/DC converter 23 OFF, turn the DC/AC inverter 29 ON, and turn the DC-DC converter 30 ON.

Accordingly, in the battery charger 20, the DC/AC inverter 29 which has received DC power from the battery 10 as shown in FIG. 7 converts the DC power in the battery 10 into AC power so that the power can be used as a power source for other AC-powered apparatuses, for example, a television. Furthermore, the DC-DC converter 30 converts the voltage of the DC power of the battery 10 so that the power can be used for other DC-powered apparatuses, for example, for charging a mobile phone. Accordingly, the battery 10 is discharged. The AC/DC converter 23 does not operate because it is OFF.

The controlling unit 21 receives a variety of information from the battery 10 via the communication unit 33, and causes the battery charger 20 to be in a state in which discharging is not permitted as shown in FIG. 4, based on information indicating, for example, the residual charge amount shows that the battery is almost empty. At this time, the controlling unit 21 transmits instructions to the structural elements to turn all of the battery conduction switch 28, the AC/DC converter 23, the DC/AC inverter 29, and the DC-DC converter 30 OFF. As a result, in the battery charger 20, no current flows from the commercial AC power source or the battery 10 as shown in FIG. 8. Since power supply to the power source unit 21a in the controlling unit 21 is interrupted, various communications using the signal lines also enter a state of OFF.

Here, as described above, when the battery 10 or the battery charger 20 is approaching the limit with respect to the discharging for supplying electric power to the other apparatuses, the controlling unit 21 transmits an instruction to the alarm sound unit 35 to inform a user, for example, by outputting an alarm sound. Under the condition that discharging further proceeds and the battery 10 and the battery charger 20 have reached the limit, the controlling unit 21 turns the battery conduction switch 28 OFF to stop the power supply from the battery 10 to the other apparatuses. That is, the controlling unit 21 causes the battery conduction switch 28 to function as a forced outage unit for stopping the power supply.

Conditions for outputting an alarm sound and conditions for stopping power supply by the battery charger 20 are shown in FIG. 9. Items used as parameters are information items regarding the residual charge amount, the current, the voltage, and the temperature, and information regarding the temperature of the battery charger 20 received from the charger temperature sensor 34. Among conditions for each item, the upper rows show first predetermined values which are conditions for outputting an alarm sound and the lower rows show second predetermined values which are conditions for stopping power supply.

That is, with regards to the residual charge amount of the battery 10, the first predetermined residual charge amount is set to, for example, 5% and the second predetermined residual charge amount is set to, for example, 0%. The controlling unit 21 causes the alarm sound to be outputted when the residual charge amount of the battery becomes 5% or less, and stops the supply of the electric power from the battery 10 when the residual charge amount of the battery becomes 0% or less.

Moreover, regarding the current of the battery 10, the first predetermined current value is set to, for example, 25 A and the second predetermined current value is set to, for example, 30 A. The controlling unit 21 causes the alarm sound to be outputted when the current of the battery becomes 25 A or more, and stops the supply of the electric power from the battery 10 when the current of the battery becomes 30 A or more.

Moreover, regarding the voltage of the battery 10, the first predetermined voltage value is set to, for example, 20 V and the second predetermined voltage value is set to, for example, 18 V. The controlling unit 21 causes the alarm sound to be outputted when the voltage of the battery becomes 20 V or less, and stops the supply of the electric power from the battery 10 when the voltage of the battery becomes 18 V or less.

Moreover, regarding the temperature of the battery 10, the first predetermined battery temperature is set to, for example, 55° C. and the second predetermined battery temperature is set to, for example, 60° C. The controlling unit 21 causes the alarm sound to be outputted when the temperature of the battery becomes 55° C. or more, and stops the supply of the electric power from the battery 10 when the temperature of the battery becomes 60° C. or more.

Moreover, regarding the temperature of the battery charger 20, the first predetermined charger temperature is set to, for example, 55° C. and the second predetermined charger temperature is set to, for example, 60° C. The controlling unit 21 causes the alarm sound to be outputted when the temperature of the battery charger becomes 55° C. or more, and stops the supply of the electric power from the battery 10 when the temperature of the battery charger becomes 60° C. or more.

It is to be noted that the first predetermined residual charge amount, the first predetermined current value, the first predetermined voltage value, and the first predetermined battery temperature described above are preset arbitrary residual charge amount, current value, voltage value, and temperature of the battery 10. Moreover, the first predetermined charger temperature is a preset arbitrary temperature of the battery charger 20. The values are such that it is possible to determine that the battery 10 and the battery charger 20 are approaching a state in which maintenance of performance will likely to be negatively affected. Although these values shown in FIG. 9 are stored in advance, for example, in a storing unit (not shown) in the controlling unit 21, these values may be appropriately set as necessary.

For example, the "first predetermined residual charge amount" regarding the residual charge amount of the battery can be set to, for example, 3 or 5% for the whole battery capacity, but may be appropriately set as necessary. Although the "first predetermined residual charge amount" is set to "5%" in this embodiment, it is not limited to such a residual charge amount. The "first predetermined current value" regarding the current of the battery can be set to, for example, 25 or 30 A, but may be appropriately set as necessary. Although the "first predetermined current value" is set to "25 A" in this embodiment, it is not limited to such a current value. The "first predetermined voltage value" regarding the voltage value of the battery can be set to, for example, 20 or 18 V, but may be appropriately set as necessary. Although the "first predetermined voltage value" is set to "20 V" in this embodiment, it is not limited to such a voltage value. The "first predetermined battery temperature" regarding the temperature of the battery can be set to, for example, 55 or 60° C., but may be appropriately set as necessary. Although the "first predetermined battery temperature" regarding the temperature of the battery is set to "55° C." in this embodiment, it is not limited to such a temperature.

Moreover, the "first predetermined charger temperature" regarding the temperature of the battery charger can be set to, for example, 55 or 60° C., but may be appropriately set as necessary. Although the "first predetermined charger temperature" regarding the temperature of the battery charger is set to "55° C." in this embodiment, it is not limited to such a temperature.

It is to be noted that the second predetermined residual charge amount, the second predetermined current value, the second predetermined voltage value, and the second predetermined battery temperature described above are preset arbitrary residual charge amount, current value, voltage value, and temperature of the battery 10. Moreover, the second predetermined charger temperature is preset arbitrary temperature of the battery charger 20. The values are such that it is possible to determine the battery 10 and the battery charger 20 have a high possibility of negatively affecting maintenance of performance. Although these values shown in FIG. 9 are stored in advance, for example, in a storing unit (not shown) in the controlling unit 21, these values may be appropriately set as necessary.

For example, the "second predetermined residual charge amount" regarding the residual charge amount of the battery can be set to, for example, 0 or 1% for the whole battery capacity, but may be appropriately set as necessary. Although the "second predetermined residual charge amount" is set to "0%" in this embodiment, it is not limited to such a residual charge amount. The "second predetermined current value" regarding the current value of the battery can be set to, for example, 25 or 30 A, but may be appropriately set as necessary. Although the "second predetermined current value" is set to "30 A", it is not limited to such a current value. The "second predetermined voltage value" regarding the voltage value of the battery can be set to, for example, 20 or 18 V, but may be appropriately set as necessary. Although the "second predetermined voltage value" is set to "18 V" in this embodiment, it is not limited to such a voltage value. The "second predetermined battery temperature" regarding the temperature of the battery can be set to, for example, 55 or 60° C., but may be appropriately set as necessary. Although the "second predetermined battery temperature" regarding the temperature of the battery is set to "60° C." in this embodiment, it is not limited to such a temperature.

Moreover, the "second predetermined charger temperature" regarding the temperature of the battery charger can be set to, for example, 55 or 60° C., but may be appropriately set as necessary. Although the "second predetermined charger temperature" regarding the temperature of the battery charger is set to "60° C." in this embodiment, it is not limited to such a temperature.

Moreover, when the controlling unit 21 receives, from the battery 10 via the communication unit 33, information indicating that the battery 10 is approaching the limit with respect to the supply of the electric power, the controlling unit 21 transmits an instruction to the alarm sound unit 35 to inform the user, for example, by outputting an alarm sound. Furthermore, when the controlling unit 21 receives, from the battery 10 via the communication unit 33, information indicating that the battery 10 has reached the limit with respect to the supply of the electric power, the controlling unit 21 turns the battery conduction switch 28 OFF to stop the supply of the electric power from the battery 10 to the other apparatus.

As described above, the battery charger 20 in the power supply apparatus 1 is mechanically and electrically connectable to and disconnectable from the battery 10 that is for supplying electric power to the power-assisted bicycle 100, and includes an AC outlet 31 and/or the USB connecting terminal 32 that are electrically connected with the other apparatus and for supplying the electric power from the battery 10 to the other apparatus. Accordingly, the battery 10 itself can be used as only a power source for the power-assisted bicycle 100, but the battery charger 20 is capable of utilizing the battery 10 for driving and charging the other apparatuses having power plugs for an AC outlet and/or a USB connection.

The battery charger 20 is mechanically and electrically connectable to and disconnectable from the battery 10 which is detached from the power-assisted bicycle 100. Thus, it is possible to prevent the battery 10 from supplying electric power to both of the power-assisted bicycle 100 and the battery charger 20.

Moreover, the battery charger 20 includes a power converting unit such as the DC/AC inverter 29 and the DC-DC converter 30 which converts the electric power in the battery 10 for supplying the electric power from the battery 10 to the other apparatus. Thus, in the battery charger 20, it is possible that the DC/AC inverter 29 or the DC-DC converter 30 converts the electric power in the electrically connected battery 10 so that the electric power can be used in the other apparatuses, and then the electric power is supplied to the other apparatuses via the AC outlet 30 or the USB connecting terminal 32.

That is, the battery charger 20 converts the DC power charged in the battery 10 into the AC power using the DC/AC inverter 29, and supplies the AC power to the other apparatuses via the AC outlet 31. Accordingly, the battery charger 20 is capable of utilizing the battery 10 mounted on the power-assisted bicycle 100 as a power source for, for example, a lighting apparatus or a television apparatus. Since the battery charger 20 includes the DC/AC inverter 29, it is possible to avoid the control circuit such as an inverter from being included in the battery 10 itself.

Moreover, the battery charger 20 converts the voltage of the DC power charged in the battery 10 using the DC-DC converter 30, and supplies the converted DC power to the other apparatuses via the USB connecting terminal 32. Accordingly, the battery charger 20 is capable of utilizing the battery 10 mounted on the power-assisted bicycle 100 as a power source for, for example, charging a cellular phone. Since the battery charger 20 includes the DC-DC converter 30, it is possible to avoid the control circuit such as a converter from being included in the battery 10 itself.

Furthermore, the battery charger 20 includes the charging/discharging switch 22 for switching among charging of the battery 10, discharging for supplying the electric power from the battery 10 to the other apparatuses, and a block (OFF) of charging or discharging of the battery 10. With this, the states of the operation of the battery charger 20, for example, charging, discharging, and a stop of charging and discharging are apparent. Thus, in the battery charger 20, it is possible to prevent problems that the electric power is discharged to the other apparatuses from the battery 10 while the battery 10 is being charged, or the electric power in the battery 10 is wasted as a result of the battery 10 being left connected to the battery charger 20.

Moreover, the battery charger 20 includes the communication unit 33 which receives information regarding the residual charge amount, the current, the voltage, and the temperature of the battery 10 through communication and the charger temperature sensor 34 which detects the temperature of the battery charger 20. Furthermore, the battery charger 20 includes the alarm sound unit 35 which outputs information indicating the state of the battery 10 or the battery charger 20 when the residual charge amount of the battery 10 received via the communication unit 33 decreases to the first predetermined residual charge amount (5%), when the current of the battery 10 received via the communication unit 33 increases to the first predetermined current value (25 A), when the voltage of the battery 10 received via the communication unit 33 decreases to the first predetermined voltage value (20 V), when the temperature of the battery 10 received via the communication unit 33 increases to the first predetermined battery temperature (55° C.), or when the temperature of the battery charger 20 detected by the charger temperature sensor 34 increases to the first predetermined charger. temperature (55° C.). With this, the user is informed that the battery 10 or the battery charger 20 is approaching the limit with respect to discharging for supplying the electric power to the other apparatuses, for example, by outputting an alarm sound. As a result, the battery charger 20 can prompt the user to suppress or stop use of the electric power in the battery 10.

When the communication unit 33 receives information transmitted from the battery 10 and indicating that the battery 10 is approaching the limit in supplying the electric power, the battery charger 20 also outputs the information indicating that the battery 10 is approaching the limit in supplying the electric power. As a result, the battery charger 20 can prompt the user to suppress or stop use of the electric power in the battery 10.

Furthermore, the battery charger 20 includes the battery conduction switch 28 which stops the supply of the electric power from the battery 10 to the other apparatuses when the residual charge amount of the battery 10 decreases to the second predetermined residual charge amount (0%), when the current of the battery 10 increases to the second predetermined current value (30 A), when the voltage of the battery 10 decreases to the second predetermined voltage value (18 V), when the temperature of the battery 10 increases to the second predetermined battery temperature (60° C.), or when the temperature of the battery charger 20 increases to the second predetermined charger temperature (60° C.). With this, the battery charger 20 stops supplying the electric power from the battery 10 to the other apparatuses under the condition that the battery 10 or the battery charger 20 has reached the limit with respect to discharging for supplying the electric power to the other apparatuses. Accordingly, the battery charger 20 is capable of preventing deterioration or shorter lifetime of the battery 10 that is caused as a result of the battery 10 keeping discharging even after the limit is exceeded.

When the communication unit 33 receives the information indicating that the battery 10 has reached the limit with respect to supply of the electric power, the battery charger 20 also stops supplying the electric power from the battery 10 to the other apparatuses under the condition that the information has been received. Accordingly, the battery charger 20 is capable of preventing deterioration or shorter lifetime of the battery 10 that is caused as a result of the battery 10 keeping discharging even after the limit is exceeded.

According to the configuration of the above embodiment, it is possible to provide a battery charger 20 which enables the battery 10 mounted on a specific apparatus such as the power-assisted bicycle 100 to be used as a power source for the other apparatus. Moreover, it is possible to provide a power supply apparatus 1 including the battery charger 20 and the battery 10 which supplies electric power to the power-assisted bicycle 100.

Figure 10:
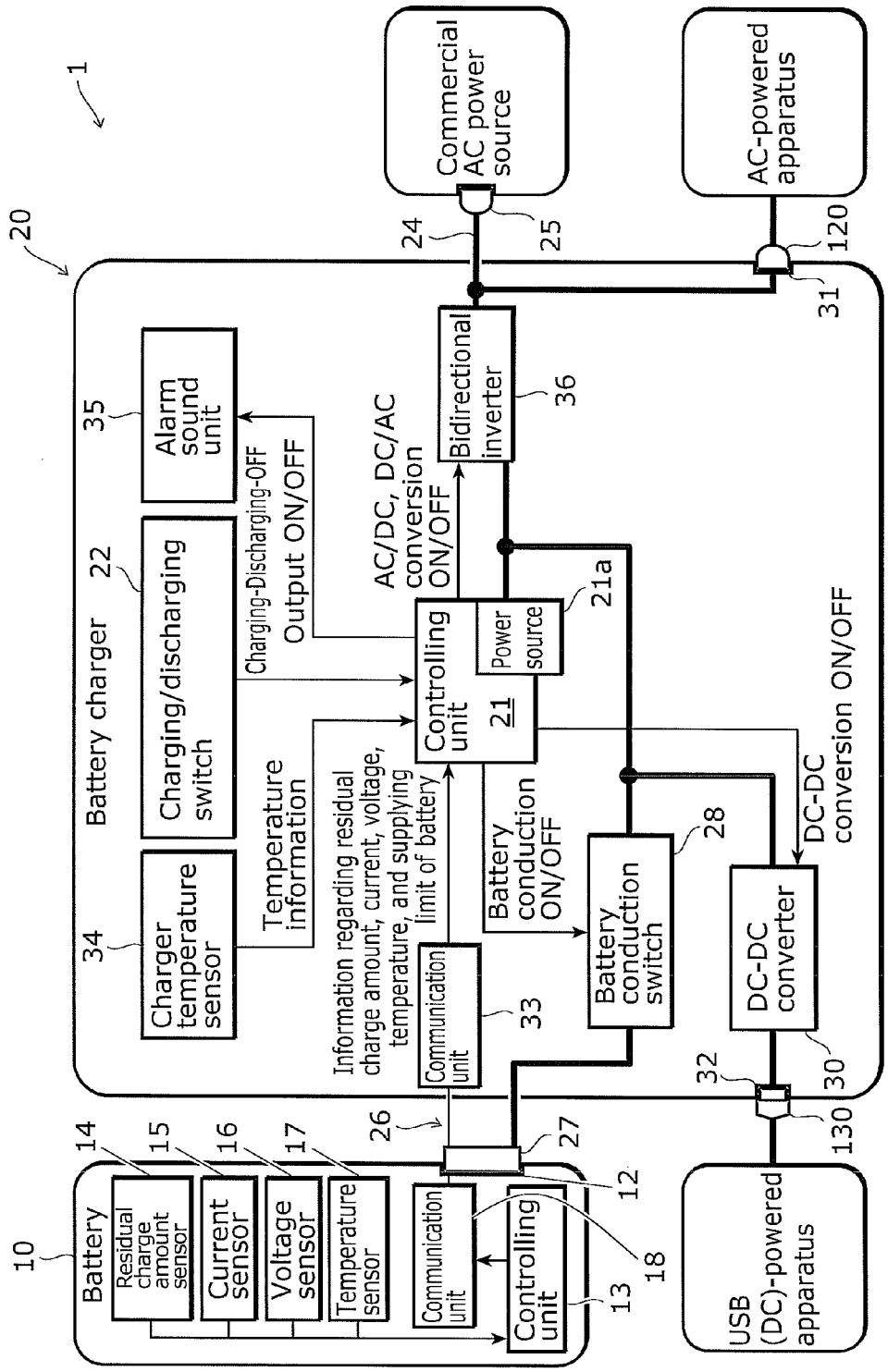
FIG. 10 is a block diagram showing a configuration of the battery charger according to Embodiment 2 of the present invention.

Next, a configuration of a battery charger according to Embodiment 2 of the present invention will be described with reference to FIG. 10. FIG. 10 is a block diagram showing a configuration of the battery charger. It is to be noted that basic configuration of this embodiment is the same as that of the above Embodiment 1 described with reference to FIGS. 1 to 9, and therefore the same reference numerals are assigned to the structural elements shared with Embodiment 1 and the descriptions are omitted.

A battery charger 20 in a power supply apparatus 1 according to Embodiment 2 includes a bidirectional inverter 36 as shown in FIG. 10. The bidirectional inverter 36 substitutes for the AC/DC converter 23 and the DC/AC inverter 29 in Embodiment 1 (refer to FIG. 2). The bidirectional inverter 36 generates DC power necessary for charging the battery 10 from the commercial AC power source, and also is a power converting unit which converts DC power in the battery 10 into AC power so that the electric power can be used as a power source for other AC-powered apparatuses such as a television.

According to the configuration of the above embodiment, as in Embodiment 1, it is possible to provide the battery charger 20 which enables the battery 10 mounted on a specific apparatus such as the power-assisted bicycle 100 to be used as a power source for the other apparatus. Moreover, it is possible to provide a power supply apparatus 1 including the battery charger 20 and the battery 10 which supplies electric power to the power-assisted bicycle 100.

Figure 11:
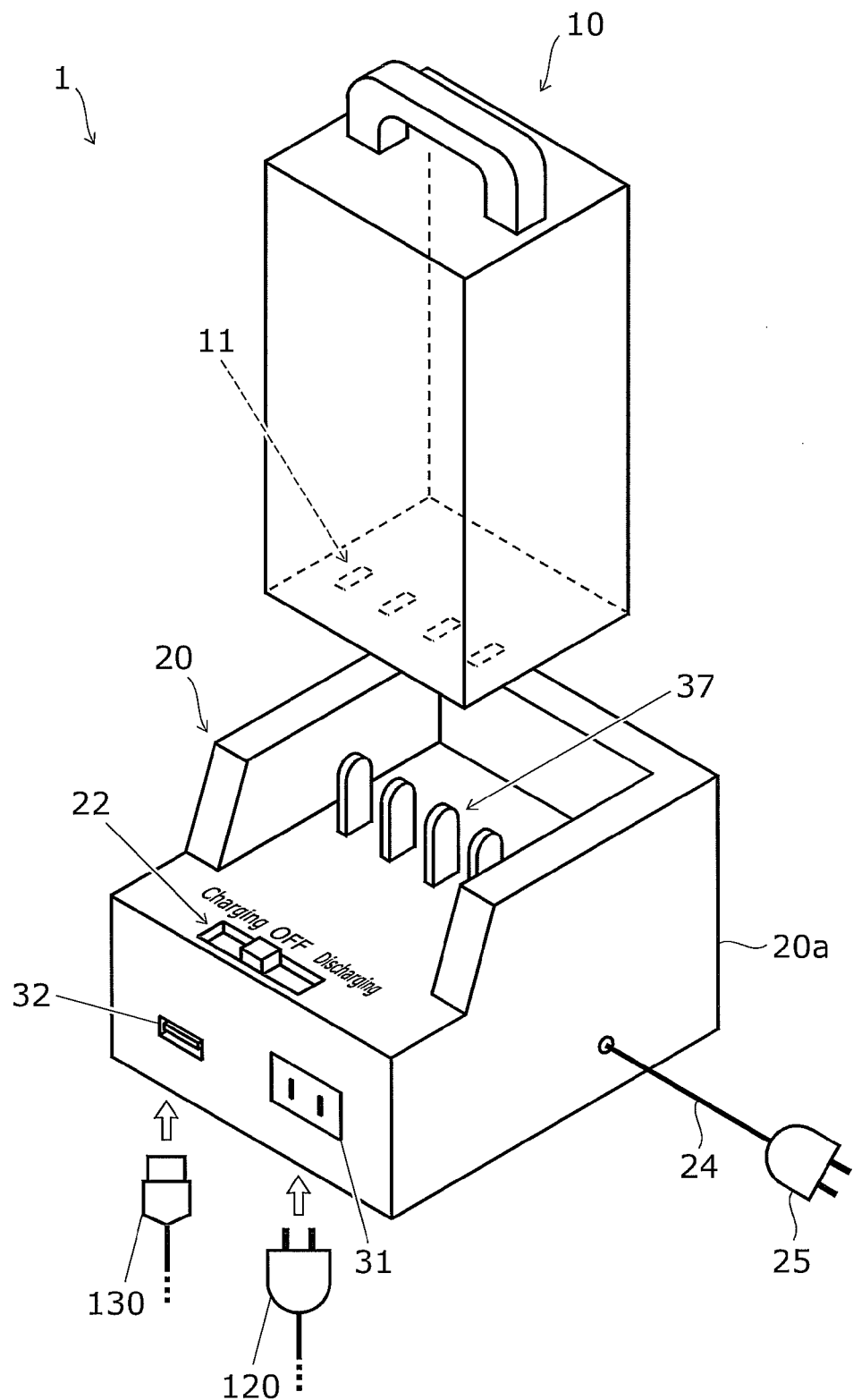
FIG. 11 is a perspective view showing a power supply apparatus including a battery charger and a battery connected to the battery charger according to Embodiment 3 of the present invention.

Next, a configuration of a battery charger according to Embodiment 3 of the present invention is described with reference to FIG. 11. FIG. 11 is a perspective view showing a power supply apparatus including a battery charger and a battery connected to the battery charger. It is to be noted that basic configuration of this embodiment is the same as the above Embodiment 1 described with reference to FIGS. 1 to 9, and therefore the same reference numerals are assigned to the structural elements shared with Embodiment 1 and the descriptions are omitted.

The battery charger 20 in the power supply apparatus 1 according to Embodiment 3 includes a charging connector 37 used for a connection with the battery 10 on the upper portion of a body case 20*a* as shown in FIG. 11. The charging connector 37 is connected to a bicycle connecting terminal 11 of the battery 10 by placing the battery 10 on the charging connector 37 at the upper portion of the battery charger 20. That is, the battery 10 does not include the charger connecting terminal 12 (refer to FIG. 1) in Embodiment 1, and the bicycle connecting terminal 11 is commonly used for a connection with the power-assisted bicycle 100 (refer to FIG. 1) and a connection with the battery charger 20.

According to the configuration of the above embodiment, as in Embodiment 1, it is possible to provide the battery charger 20 which enables the battery 10 mounted on a specific apparatus such as the power-assisted bicycle 100 to be used as a power source for the other apparatus. Moreover, it is possible to provide a power supply apparatus 1 including the battery charger 20 and the battery 10 which supplies electric power to the power-assisted bicycle 100.

The embodiments of the present invention has been described above, but the scope of the present invention is not limited to this, and various modifications are possible without materially departing from the principles of the present invention.

For example, although the battery 10 mounted on a specific apparatus such as the power-assisted bicycle 100 has been described as an example, the specific apparatus is not limited to the power-assisted bicycle but any apparatus on which a battery can be mounted is applicable. For example, the present invention is applicable to a battery charger for charging a battery for other specific apparatuses including electric vehicles such as an electric two-wheeler and an electric three-wheeler, and electric tools such as an electric drill.

Moreover, for example, the output terminal unit included in the battery charger 20 is not limited to the AC outlet 31 and the USB connecting terminal 32 in the above description and the Drawings, but may have other configurations.

INDUSTRIAL APPLICABILITY

The present invention can be used in a battery charger which is mechanically and electrically connectable to and disconnectable from a battery that is for supplying electric power to a specific apparatus.

REFERENCE SIGNS LIST

1 Power supply apparatus
10 Battery
20 Battery charger
21 Controlling unit
22 Charging/discharging switch
23 AC/DC converter
28 Battery conduction switch (Forced outage unit)
29 DC/AC inverter (Power converting unit, Inverter)
30 DC-DC converter (Power converting unit, Converter)
31 AC outlet (Output terminal unit, AC output unit)
32 USB connecting terminal (Output terminal unit, DC output unit)
33 Communication unit
34 Charger temperature sensor (Temperature detecting unit)
35 Alarm sound unit (Alarming unit)
36 Bidirectional inverter (Power converting unit, Inverter)
100 Power-assisted bicycle (Specific apparatus)

The invention claimed is:

1. A power supply apparatus, comprising:
   a connector connectable to a battery designed for an other apparatus, with the battery detached from the other apparatus;
   a charger which charges the battery connected to the connector, using electric power supplied from an external power source;
   a power converter which converts electric power output from the battery connected to the connector;
   a power outputter which supplies, to an external apparatus, the electric power resulting from the conversion by the power converter;
   a switch which switches between charging control and discharging control on the battery; and
   a controller which switches between the charging control and the discharging control on the battery, according to a mode selected by the switch.

2. The power supply apparatus according to claim 1, wherein
   the external power source is an AC power source, and
   the charger includes an AC/DC converter which converts AC power supplied from the AC power source into DC power, and outputs the DC power to the battery connected to the connector.

3. The power supply apparatus according to claim 1, wherein
the power converter is a DC/DC converter which converts a voltage of DC power output from the battery, and
the power outputter supplies the DC power output from the DC/DC converter, to the external apparatus.

4. The power supply apparatus according to claim 1, wherein
the power outputter is a USB connecting terminal.

5. The power supply apparatus according to claim 1, wherein
the switch switches between ON and OFF of supplying of the electric power to the external apparatus performed by the power outputter.

6. The power supply apparatus according to claim 1, further comprising
a communicator which communicates with the battery, and receives a parameter of at least one of information items regarding a residual charge amount, a current, a voltage, and a temperature of the battery, wherein
the controller controls power supply from the battery or power supply to the battery, based on the parameter.

7. The power supply apparatus according to claim 6, wherein
the controller stops the power supply from the battery or the power supply to the battery when the parameter received by the communicator deviates from a predetermined value.

8. The power supply apparatus according to claim 7, further comprising
a conduction switch which switches between conduction and non-conduction of a portion between the battery and the charger, wherein
the controller turns OFF the conduction switch to place the portion between the battery and the charger into a non-conduction state when the residual charge amount of the battery reaches a predetermined residual charge amount.

9. The power supply apparatus according to claim 7, further comprising
a conduction switch which switches between conduction and non-conduction of a portion between the battery and the power converter, wherein
the controller turns OFF the conduction switch to place the portion between the battery and the power converter into a non-conduction state when the residual charge amount of the battery decreases to a predetermined residual charge amount.

10. The power supply apparatus according to claim 1, further comprising:
a communicator which communicates with the battery, and receives a parameter of at least one of information items regarding a residual charge amount, a current, a voltage, and a temperature of the battery; and
an alarm informer, wherein
the controller controls informing performed by the alarm informer when the parameter received by the communicator deviates from a predetermined value.

11. The power supply apparatus according to claim 1, wherein
the power outputter is an outlet.

12. The power supply apparatus according to claim 1, wherein
the other apparatus is an electric vehicle or an electric drill.

13. The power supply apparatus according to claim 1, further comprising
a battery mechanically and electrically connectable to and disconnectable from the connector.

14. The power supply apparatus according to claim 1, wherein
the power converter is an inverter which converts DC power output from the battery connected to the connector, into AC power.

15. The power supply apparatus according to claim 3, wherein
the power outputter is a USB connecting terminal to which a USB connector of the external apparatus is connected for supplying, to the external apparatus, the DC power output from the DC/DC converter.

* * * * *